US011272005B1

(12) United States Patent
Blaszka et al.

(10) Patent No.: US 11,272,005 B1
(45) Date of Patent: Mar. 8, 2022

(54) COMMUNICATING STATE INFORMATION IN A DISTRIBUTED STORAGE ENVIRONMENT

(71) Applicant: Amazon Technologies, Inc., Seattle, WA (US)

(72) Inventors: Avram Israel Blaszka, Seattle, WA (US); Pieter Kristian Brouwer, Bellevue, WA (US); Marc Stephen Olson, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 193 days.

(21) Appl. No.: 16/141,867

(22) Filed: Sep. 25, 2018

(51) Int. Cl.
*H04L 29/08* (2006.01)
*H04L 67/1097* (2022.01)
*G06F 3/06* (2006.01)

(52) U.S. Cl.
CPC .......... *H04L 67/1097* (2013.01); *G06F 3/067* (2013.01); *G06F 3/0619* (2013.01); *G06F 3/0653* (2013.01); *G06F 3/0664* (2013.01)

(58) Field of Classification Search
CPC ... H04L 67/1097; G06F 3/0619; G06F 3/067; G06F 3/0664; G06F 3/0653
See application file for complete search history.

(56) References Cited

U.S. PATENT DOCUMENTS

| | | | | |
|---|---|---|---|---|
| 7,694,166 B1* | 4/2010 | Suggs | ................. | G06F 11/2046 714/4.11 |
| 8,046,446 B1* | 10/2011 | Karr | ................... | H04L 67/1097 709/223 |
| 8,645,542 B2* | 2/2014 | Tsao | ................... | H04L 67/1002 709/226 |
| 2007/0118618 A1* | 5/2007 | Kisel | ................... | H04N 21/472 709/219 |
| 2007/0156733 A1* | 7/2007 | Meyerson | ........... | H04L 43/0817 |
| 2015/0207880 A1* | 7/2015 | Jin | ...................... | G06F 11/2097 714/4.11 |

* cited by examiner

*Primary Examiner* — Kim T Nguyen
(74) *Attorney, Agent, or Firm* — Nicholson De Vos Webster & Elliott LLP

(57) ABSTRACT

Techniques are described for using in-band communication channels to exchange state information between components of a distributed storage environment, including between client computing devices and storage servers hosting network-connected block storage volumes. The exchange of the state information can be used, for example, to inform client computing devices of relevant events involving one or more storage volumes attached to compute instances (for example, virtual machines (VMs)) running on the client computing devices, involving one or more failover servers storing backup copies of one or more storage volumes, or involving any other relevant system components. The exchange of such state information in a distributed storage environment enables client computing devices, storage servers, and other system components to act efficiently in response to a variety of system events thereby mitigating input/output (I/O) latency increases and other issues that can arise when system components lack access to such information.

19 Claims, 7 Drawing Sheets

COMMUNICATING STATE INFORMATION IN A DISTRIBUTED STORAGE ENVIRONMENT

BACKGROUND

Many companies and other organizations operate computer networks that interconnect numerous computing systems to support their operations. For example, data centers housing significant numbers of interconnected computing systems have become commonplace, such as private data centers that are operated by and on behalf of a single organization, and public data centers that are operated by entities as businesses to provide computing resources to customers. Some public data center operators provide network access, power, and secure installation facilities for hardware owned by various customers, while other public data center operators provide "full service" facilities that also include hardware resources made available for use by their customers. However, as the scale and scope of typical data centers has increased, the tasks of provisioning, administering, and managing the physical computing resources have become increasingly complicated.

The advent of virtualization technologies for commodity hardware has provided benefits with respect to managing large-scale computing resources for many customers with diverse needs, allowing various computing resources to be efficiently and securely shared by multiple customers. For example, virtualization technologies may allow a single physical computing machine to be shared among multiple users by providing each user with one or more virtual machines hosted by the single physical computing machine, with each such virtual machine being a software simulation acting as a distinct logical computing system that provides users with the illusion that they are the sole operators and administrators of a given hardware computing resource, while also providing application isolation and security among the various virtual machines. Furthermore, some virtualization technologies can provide virtual resources that span two or more physical resources, such as a single virtual machine with multiple virtual processors that spans multiple distinct physical computing systems. As another example, virtualization technologies may allow data storage hardware to be shared among multiple users by providing each user with a virtualized data store which may be distributed across multiple data storage devices, with each such virtualized data store acting as a distinct logical data store that provides users with the illusion that they are the sole operators and administrators of the data storage resource.

BRIEF DESCRIPTION OF DRAWINGS

Various embodiments in accordance with the present disclosure will be described with reference to the drawings, in which.

DETAILED DESCRIPTION

Figure 1:
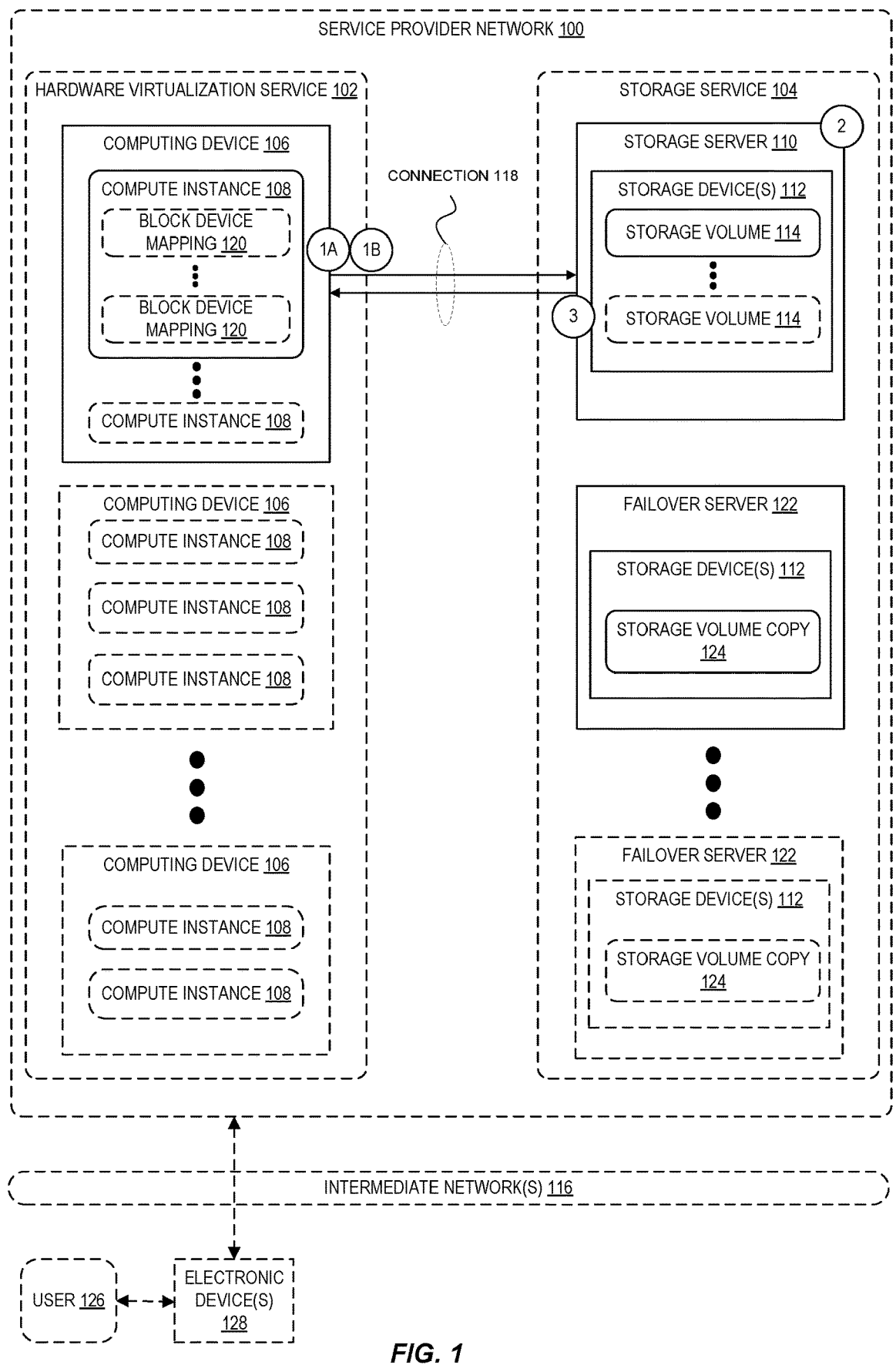
FIG. 1 is a diagram illustrating an environment for exchanging state information among storage servers and client computing devices in a distributed storage environment according to some embodiments.

Various embodiments of methods, apparatus, systems, and non-transitory computer-readable storage media are described for using in-band communication channels to exchange state information between components of a distributed storage environment, including between client computing devices and storage servers hosting network-connected block storage volumes. The exchange of the state information can be used, for example, to inform client computing devices of relevant events involving one or more storage volumes attached to compute instances (for example, virtual machines (VMs)) running on the client computing devices, involving one or more failover servers storing backup copies of one or more storage volumes, or involving any other relevant system components. The exchange of such state information in a distributed storage environment enables client computing devices, storage servers, and other system components to act efficiently in response to a variety of system events, thereby mitigating input/output (I/O) latency increases and other issues that can arise when system components lack access to such information.

Many service provider networks enable customers to provision and use various types of computing resources including, for example, compute resources (for example, VMs, containers, and so forth) and data storage resources. These data storage resources can include directly attached, block-device storage available to customer compute instances, as well as network-accessible block storage volumes that can be used in a manner similar to use of local storage volumes, among other possible types of data storage. The use of network-accessible block storage volumes managed by a storage service can provide several benefits including, for example, high availability, high durability, automatic replication of volumes, and optional encryption of the data stored thereon.

As indicated above, one benefit provided by some storage services providing network-accessible block storage volumes is automatic replication of storage volumes. For example, a storage service can offer redundancy of storage volumes by automatically provisioning failover servers used to host replicated copies of storage volumes attached to customer compute instances. In this example, a client computing device (for example, managed by a separate hardware virtualization service of a service provider network) associated with one or more storage volumes typically learns the identity (for example, an Internet Protocol (IP) address) of the failover servers it is to use in the case of failures when the device initially establishes a connection with a corresponding storage server. In the event of a failover, the client computing device can then use the identified failover server to minimize disruption to client compute instances using affected storage volumes. However, after a client computing device learns the identity of a failover server at the time a connection is established, many system events can subsequently occur which can affect which failover server the instance should use, whether a client computing device should perform a failover, among other considerations.

As one example, storage servers periodically need to update software and other system components and often become temporarily unavailable to complete such updates (for example, to perform a "hot" restart to complete an update). In existing distributed storage environments, client computing devices connected to a storage server typically are not notified when a remote storage server needs to perform such an update. Instead, to perform an update, a storage server severs its connections with any connected client computing devices and temporarily refuses any reconnect attempts through a firewall until the update is complete. This is undesirable for many reasons, including the fact that any inflight reads or writes need to be retried and the client computing device is likely to immediately attempt reconnecting with the unavailable storage server instead of failing over to an appropriate failover server or waiting until the update is complete before attempting to reconnect. In general, when a storage server becomes unavailable to a client computing device in existing distributed computing environments, a most efficient action to take in response is often not evident because a cause of the storage server's unavailability is often not evident to the client computing devices. Furthermore, due in part to resource constraints on client computing devices, the devices in existing environments typically do not seek out such information from other system components and instead make assumptions about the state of the environment that are often inaccurate.

According to embodiments described herein, in-band communication channels between storage servers and client computing devices (and possibly between other system components) are used to communicate relevant state information throughout the lifespan of the client-server connections. For example, an in-band communication channel can be used to exchange event notification messages to indicate, for example, when a storage server is pending an update and is soon to become temporarily available, when a failover storage server for a client computing device becomes unavailable, when a failover storage server is added, and so forth. The ability for system components to exchange and act on such state information in a distributed storage environment can significantly improve the availability and performance of the system by, for example, reducing reconnect latency when client-server connections are broken to perform updates, reducing potential issues when failover servers change, enabling more efficient load balancing of storage volumes, enabling client computing devices to connect to healthier or more "hydrated" storage servers in some instances, among other possible benefits.

FIG. 1 is a diagram illustrating an environment for exchanging state information among storage servers and client computing devices in a distributed storage environment according to some embodiments. In an embodiment, a hardware virtualization service 102 and a storage service 104 operate as part of a service provider network 100 and each comprise one or more software modules executed by one or more electronic devices at one or more data centers and geographic locations. The service provider network 100 in FIG. 1 shows only a hardware virtualization service 102 and a storage service 104 for illustrative purposes; in general, a service provider network 100 may provide many different types of services as part of the service provider network 100. Although the distributed storage environment in FIG. 1 is shown in the context of a service provider network 100, in general, the embodiments described herein can be used between any distributed storage environment including client computing devices and remote storage devices.

A service provider network 100 provides users with the ability to use one or more of a variety of types of computing-related resources such as compute resources (for example, executing VM instances and/or containers, executing batch jobs, executing code without provisioning servers), data/storage resources (for example, object storage, block-level storage, data archival storage, databases and database tables, and so forth), network-related resources (for example, configuring virtual networks including groups of compute resources, content delivery networks (CDNs), Domain Name Service (DNS)), application resources (for example, databases, application build/deployment services), access policies or roles, identity policies or roles, machine images, routers and other data processing resources, etc. These and other computing resources may be provided as services, such as a hardware virtualization service 102 that can execute compute instances (for example, compute instances 108), a storage service 104 that can provide network-accessible storage volumes (for example, storage volumes 114), and the like. The users (or "customers") of service provider networks 100 use one or more user accounts that are associated with a customer account, though these terms may be used somewhat interchangeably depending upon the context of use. Users 126 often interact with a service provider network 100 via electronic device(s) 128 and across one or more intermediate networks 116 (for example, the internet) via one or more interfaces, such as through use of application programming interface (API) calls, via a console implemented as a website or application, and so forth. The interfaces may be part of, or serve as a front-end to, a control plane of the service provider network 100 that includes "backend" services supporting and enabling the services that may be more directly offered to customers.

To provide these and other computing resource services, service provider networks 100 often rely upon virtualization techniques. For example, virtualization technologies may be used to provide users the ability to control or utilize compute instances 108 (for example, a VM using a guest operating system (O/S) that operates using a hypervisor that may or may not further operate on top of an underlying host O/S, a container that may or may not operate in a VM, an instance that can execute on "bare metal" hardware without an underlying hypervisor), where one or multiple compute instances 108 can be implemented using a single electronic device (for example, a single client computing device 106). Thus, a user may directly utilize a compute instance 108 hosted by the service provider network 100 to perform a variety of computing tasks, or may indirectly utilize a compute instance 108 by submitting code to be executed by the provider network, which in turn utilizes a compute instance 108 to execute the code (typically without the user having any control of or knowledge of the underlying compute instance(s) involved).

As indicated above, a service provider network 100 can include a storage service 104 that provides persistent block storage volumes (for example, storage volumes 114) for use with various types of compute instances 108 and other computing resources in the service provider network 100. In some embodiments, storage volumes provided by a storage service 104 can be replicated within the service provider network to protect against various types of failures, offering high availability and durability for the storage volumes. In general, each storage volume can provide any amount of storage capacity depending on a customer's needs (for example, a service provider network 100 may provide storage volumes ranging from 1 GB to 16 TB in size or any other range). Once a storage volume is created at a storage service 104, it can be attached to a compute instance (for example, a compute instance 108 hosted by a client computing device 106 managed by a hardware virtualization service 102). Once a storage volume 114 is attached to a compute instance 108, the volume appears to the compute instance as a mounted device similar to any hard drive or other block device. At that point, a compute instance 108 can interact with the volume just as it would with a local drive, formatting it with a file system or installing applications on it directly. Typically, a storage volume 114 is attached to only one compute instance 108 at a time, but many storage volumes 114 can be attached to a single compute instance 108. However, in some cases, a single storage volume 114 can be attached to two or more separate compute instances 108 either permanently or temporarily (for example, during a process for migrating a compute instance 108 from one computing device 106 to another). In some embodiments, a storage volume 114 can be used as a boot partition for a compute instance 108, which enables users to preserve boot partition data beyond the life of a compute instance 108. In some embodiments, a single storage volume 114 can be stored as multiple partitions across two or more separate storage servers 110. In this case, a computing device 106 hosting a compute instance 108 that attaches a storage volume 114 stored across multiple storage servers 110 can establish a separate connection with each of the respective storage servers and can manage I/O interactions with the storage volume for the compute instance.

The example shown in FIG. 1 includes several compute instances 108 managed by a hardware virtualization service 102, at least one of which has attached one or more storage volumes 114 managed by a storage service 104. As shown, each of the compute instances 108 can be hosted by a client computing device 106 along with other compute instances on the same computing device, or a compute instance 108 can be the only compute instance hosted by a computing device. Each of the storage servers 110 can host any number of separate storage volumes, which can be stored at any number of underlying storage devices (for example, on hard disk drives (HDDs), solid-state drives (SSDs), or any other type of storage devices or combinations thereof). As indicated above, in some examples, a storage volume can also be stored across one or more separate storage servers 110.

In some embodiments, some or all of the client computing devices 106 of the hardware virtualization service 102 include one or more of hardware processing elements, system memory, interconnects, one or more I/O proxy devices (each of which includes one or more separate hardware processing elements), and optionally one or more local data storage devices.

In an embodiment, a hardware processing element is generally any type of processor capable of executing instructions. For example, in various embodiments, a hardware processing element is a general-purpose or embedded processor implementing any of a variety of instruction set architectures (ISAs), such as the x86, ARM, PowerPC, SPARC, or MIPS ISAs, or any other suitable ISA. In multiprocessor systems, each of hardware processing elements may commonly, but not necessarily, implement the same ISA. In embodiments with multiple hardware processing elements, each processing element can have a dedicated bank of system memory or share system memory with other hardware processing elements. In some embodiments, a hardware processing element accesses system memory via a memory bus or via an interconnect. A hardware processing element can include one or more processor cores, each having one or more levels of dedicated or shared cache (for example, L1 cache, L2 cache, and so forth).

In an embodiment, system memory stores program instructions and other data accessible by hardware processing elements. In other embodiments, program instructions and/or data can be received, sent, or stored on different types of computer-accessible media. In various embodiments, system memory is implemented using any suitable computer-accessible storage medium. Generally speaking, a computer-accessible storage medium can include non-transitory storage media or memory media such as magnetic or optical media, for example, a disk or DVD/CD coupled to computer system via an interconnect. A non-transitory computer-accessible storage medium may also include any volatile or non-volatile media such as random-access memory (RAM) (for example, SDRAM, static RAM, dynamic RAM (DRAM), double data rate (DDR) SDRAM, and the like), read only memory (ROM), or other non-volatile memory (for example, Flash). Computer-accessible media may include transmission media or signals such as electrical, electromagnetic, or digital signals, conveyed via a communication medium such as a network and/or a wireless link, such as may be implemented via a network interface. In such cases, a client computing device may access program instructions and data from a remote computer-accessible storage medium via the computer-accessible media.

In an embodiment, a client computing device 106 optionally includes one or more network interfaces that allow data to be exchanged between the computing device and other electronic devices attached to a network or networks, such as other client computing devices 106, storage servers 110, or any other hardware within a service provider network 100 of which the computing device is a part, or with other computing devices external to the service provider network. In some embodiments, a client computing device 106 includes one or more I/O proxy devices, each including its own one or more network interfaces that may be separate from other network interfaces of the client computing device 106. In various embodiments, a network interface of a client computing device 106 or a network interface of an I/O proxy device supports communication via any suitable wired or wireless data network, such as Ethernet (for example, 802.3), 802.11, IP-based networks, Fiber Channel, Infiniband, and the like. These network interfaces may support communication via telecommunications/telephony networks such as analog voice networks or digital fiber communications networks any other suitable type of network and/or protocol.

In an embodiment, a client computing device 106 includes interconnects which coordinate I/O traffic between components of the device, such as between hardware processing elements, memory, network interfaces, I/O proxy devices, and any other components that may be coupled to interconnects. Interconnects generally facilitate communication by a protocol that controls the timing, sequence, form, and content of data being exchanged among components. Example interconnects and protocols include QuickPath Interconnect (QPI), Peripheral Component Interconnect (PCI), Universal Serial Bus (USB), Small Computer System Interface (SCSI), Serial Attached SCSI (SAS), AT Attachment (ATA), Ethernet, variants or progeny of each, and the like. Multiple different interconnects may couple components of a client computing device 106. For example, some components may be connected with an I2C bus, others with a PCI bus, and others with both the PCI bus and the I2C bus. In some embodiments, bridges relay communications between different types of interconnects (for example, from one device on a first interconnect, through a bridge, to another device on a second interconnect).

In some embodiments, the hardware processing elements of a client computing device 106 can include one or more special purpose (SP) processors. In embodiments with multiple SP processors, each SP processor may have a dedicated bank of memory or may share memory with other SP processors. Each SP processor might be an accelerator, coprocessor, field-programmable gate array (FPGA), application-specific integrated circuit (ASIC), or other processing device that can perform specialized operations (for example, graphics rendering, encryption and decryption, and so forth). A client computing device 106 can include one or more than one type of SP processor.

In some embodiments, a client computing device 106 can include one or more local data storage devices. In some embodiments, local data storage devices provide block storage via one or more logical volumes to software executing on the computer system, including to one or more customer compute instances 108 that may be virtualized on a client computing device 106. Hardware processing elements and/or other devices (for example, direct memory access (DMA) controllers, and so forth) can access local storage volume(s) to store and retrieve code and/or data. Local data storage devices generally include non-transitory computer-readable media, such as magnetic disks, optical disks, flash memory devices, phase-change memory devices, RAM, ROM, and the like.

In some embodiments, a client computing device 106 can additionally or alternatively access one or more remote and network-accessible data storage devices (for example, storages device 112) via one or more networks. These remote, network-accessible data storage devices similarly can provide block storage via logical volumes (for example, storage volumes 114) to software executing on the client computing device 106, including to customer compute instances 108 running on the device. In some embodiments, the use of network-accessible data storage devices 112 is managed by a storage service 104 of a service provider network 100. In some embodiments, a client computing device 106 includes one or more other I/O devices that can store, process, and/or communicate code and/or data for the client computing device.

In an embodiment, a client computing device 106 includes one or more I/O proxy devices. In some embodiments, each of the I/O proxy devices is at a component interface to the client computing device 106. For example, an I/O proxy device can reside between hardware processing elements of a client computing device 106 and one or more data storage devices (for example, local data storage device(s), network-accessible data storage device(s), or both). An I/O proxy device generally may be included between any I/O devices of a client computing device 106 and the hardware processing elements of the client computing device. In addition to interfacing to one or more local interconnects, an I/O proxy device may include one or more network interfaces that enable the I/O proxy device to communicate with external components.

In an embodiment, an I/O proxy device (including any hardware processing elements, I/O proxy device memory, and network interface(s)) is part of an "offload card" (for example, a PCI Express-based card) that is connected to the motherboard of the client computing device, and a client computing device 106 can include one or more such offload cards. For example, a client computing device 106 can include one offload card that is connected to a control plane of a service provider network 100 (via a network interface of the offload card) of which the client computing device 106 is a part, and also include another offload card that is connected to a data plane network of the service provider network 100 and that can be configured to perform various I/O and state exchanging processes as described herein. In this example, the offload card can establish connections with remote storage servers 110, manage I/O operations, exchange state information with remote storage servers and other system components, and so forth. In other embodiments, both the control plane and data plane functionality can be implemented and performed using a single offload card.

In an embodiment, an I/O proxy device executes software used to enable virtualization of a client computing device 106 (for example, enabling execution of customer compute instances 108 on the client computing device) by offloading operations that would otherwise be performed by the other processor(s) in the client computing device. An example operation is coordinating shared resources amongst virtualization instances, such as in situations where multiple customer compute instances 108 compete for access to a single device, such as a network interface. Another example operation is device emulation to enable software executing on a hardware processing element to interact with one or more local data storage device(s) or network-accessible data storage device(s). In addition to offloading virtualization management from other processors in a client computing device 106 to the I/O proxy device, an I/O proxy device can provide inter- and intra-system security to isolate compute instances 108 that may be allocated to different customers and executing on different processors within the client computing device 106 and to isolate those instances from the remainder of a service provider network 100 of which the client computing device 106 may be a part. In an embodiment, the multi-tenant operation of a client computing device 106 enables two or more different customers of a service provider network 100 to concurrently run compute instances on the system.

In some embodiments, an I/O proxy device includes functionality used to manage compute instances 108 executing on a client computing device. Such management can include pausing and un-pausing compute instances, launching and terminating compute instances, performing memory transfer and copying operations, and so forth. In some embodiments, these operations are performed by a hypervisor that works with the I/O proxy device that is executed by one or more other hardware processing elements of the client computing device 106 (for example, the hypervisor can direct the I/O proxy device to create or destroy virtual devices for virtual machines on the server). In other embodiments, no hypervisor executes on the other hardware processing elements of the client computing device 106. In such embodiments, the hypervisor executed by the I/O proxy device can accommodate requests from the other processors.

In some embodiments, program instructions and any other data for the hardware processing elements of the I/O proxy device is stored on an I/O proxy device memory accessible by hardware processing elements of the I/O proxy device, similar to how system memory stores program instructions and data accessible by hardware processing elements, as described above. In an embodiment, the I/O proxy device memory includes storage of code used to manage communication channels with remotely-accessible storage volumes and other system components, as described elsewhere herein.

As indicated above, a client computing device 106 may at any point in time be executing one or more applications (for example, user applications) hosted by one or more guest operating systems, where these guest operating systems and applications execute on the hardware processing elements. The guest operating systems have access to some hardware components (for example, via software drivers) and access to other hardware components via software executing on the I/O proxy devices. Access to I/O devices via an I/O proxy device is generally transparent to the guest operating systems and user applications. For example, a guest operating system executing on a hardware processing element can initiate an I/O request message to a local or remote data storage device 112 as if it were in direct communication with the local or remote data storage device via an interconnect, even through traffic between the hardware processing element and local or remote data storage device is routed through the I/O proxy device.

In the example of FIG. 1, a storage server 110 includes one or more storage volumes, each of can be attached to an instance running on a client computing device 106. For example, a compute instance 108 can include one or more block device mappings 120, each corresponding to a storage volume 114 hosted by a storage server 110. In an embodiment, the block device mappings 120 generally define the block storage devices that are attached to a compute instance 108. In some examples, block device mappings 120 can be specified as part of an image used to launch a compute instance 108 so that the block device mappings are used by any instances launched based on the image. Alternatively, block device mappings 120 can be specified when a compute instance 108 is launched or at any point after a compute instance 108 is launched, thereby causing the compute instance to attach the block storage volumes specified by the block device mappings 120. As indicated above, once a storage volume 114 is attached to a compute instance 108 via a block device mapping 120, the storage volume 114 can be mounted by the compute instance 108 so that the compute instance can access the storage volume. A storage volume 114 can also be detached from a compute instance 108 to which it is attached, at which point the compute instance can no longer access the storage volume.

In an embodiment, the process of attaching a storage volume 114 to a compute instance 108 involves creating a network-based communication channel (represented by the connection 118) between a client computing device 106 hosting the compute instance 108 and a storage server 110 (or creating multiple connections if the volume is stored across multiple storage servers). This connection 118 between a client computing device 106 and a storage server 110 can be implemented in various ways, and can be based on a variety of different protocols (for example, the Transmission Control Protocol (TCP) or any other data exchange protocols). For example, at the client computing device 106, the logic for handling such connections 118 in some architectures is offloaded from the hardware exposed to the compute instances 108 and onto an "offload card," as described above. In this embodiment, software on an offload card can be responsible for both sending and receiving storage I/O traffic to/from storage servers 110, in addition to tasks like establishing and maintaining the network connections with the storage servers 110, identifying which of the various storage servers 110 is responsible for managing the storage volumes 114 (or portions of a storage volume) that are used by various compute instances 108 running on the client computing device 106, among other operations. In other embodiments, the management of connections 118 between client computing devices 106 and storage servers 110 can be implemented at the client-side by a hypervisor, for example, in a privileged "host domain" managed by the hypervisor, by individual client compute instances 108, or by any other software or client computing device system component.

In an embodiment, a storage service 104 generally includes a fleet of purpose-built storage servers. These storage servers similarly can comprise various hardware platforms (some of which, for example, may include one or more I/O proxy cards and other possible components described above in connection with client computing devices) and are generally managed on servers that are independent of a hardware virtualization service 102 and other services. The management of the client computing device-storage server connections similarly can be implemented at the server-side at I/O proxy cards, by hypervisors or other software running on the storage servers, or by other server components depending on particular hardware platforms used.

As indicated above, network-accessible storage volumes can be replicated within a storage service 104. As shown in FIG. 1, for example, failover servers 122 host replicated copies 124 of storage volumes 114 stored by storage servers 110. The arrangement shown in FIG. 1 is for illustrative purposes only; in other examples, a single failover server 122 can host replicated copies of storage volumes hosted by two or more separate storage servers 110, a same storage volume can be replicated on two or more failover servers 122, and so forth. In the distributed storage environment illustrated in FIG. 1 and others, a number of system events can occur for which the communication of state information among the storage servers 110, client computing devices 106, and possibly other system components can be beneficial, as described herein.

As indicated above, in some embodiments, the relationship between client compute instances 108 and remotely-accessible storage volumes 114 is managed via network connections (for example, connection 118) between client computing devices 106 and storage servers 110. In an embodiment, at circle "1A" in FIG. 1, a client computing device 106 initiates a connection 118 with a remote storage server 110. For example, a client computing device 106 may initiate a connection 118 with storage server 110 because a client compute instance 108 hosted by the client computing device 106 has requested to attach a storage volume 114 hosted by a storage server 110 (for example, based on a block device mapping 120 associated with the client compute instance 108). In some embodiments, a centralized management system of the storage service 104 or another system component can communicate to the client computing device 106 an identifier of a primary storage server 110 (or primary storage servers if the storage volume spans multiple storage servers) at which the storage volume is to be hosted and optionally one or more failover servers 122 at which a replicated copy of the storage volume is to be hosted. Although the communication channel provided by the connection 118 is sometimes described herein in the context a client computing device and a storage server, in an embodiment, each connection 118 generally relates to a compute instance-storage volume pair and one or more separate connections are established for each such pairing. In other embodiments, a single connection 118 can be used to manage multiple compute instance-storage volume pairs for a same computing device 106 and storage server 110 pairing (for example, to manage multiple storage volumes attached to multiple different compute instances running on a same computing device). In general, a client computing device 106 and a storage server 110 can simultaneously have any number of such connections 118 depending on a number of compute instance-storage volume pairs involving each of the devices and implementation of the connection.

In an embodiment, when a client computing device 106 initially establishes a connection 118 with a storage server 110, the client computing device 106 and storage server 110 exchange information indicating a version of a protocol and capabilities supported by each for use over the connection 118. In this example, a client computing device 106 and a storage server 110 can exchange version and/or capability identifiers indicating that both the client computing device 106 and storage server 110 are configured to handle the exchange of event notification messages, as described herein.

In an embodiment, at circle "1B," the client computing device 106 sends an event notification request message to the storage server 110 at some point in time after the communication channel is established via the connection 118. The use of the event notification request message, for example, can be used to conform to a request-response message exchange pattern for communications sent over the communication channel between the devices. As indicated above, the types of system events for which event notification messages are to be sent are varied and can occur sporadically; thus, once a client computing device 106 sends an event notification request message to a storage server 110, the storage server may queue the request for hours, days, weeks, or longer before a corresponding event occurs.

In some embodiments, a client computing device 106 can send more than one event notification request message before an event notification response message is received for the initial request message (for example, to reduce the reporting latency for subsequent event notification response messages). In this embodiment, a storage server 110 optionally enforces a server-defined maximum number of outstanding event notification request messages for each connection 118 (for example, a maximum of three (3) or any other specified number of outstanding event notification request messages can be queued for any one connection). The storage server 110 can queue the requests based on a time at which each of the requests was received or was generated and, as system events related to the connection occur, the storage server 110 can respond to the pending event notification request messages in the queue sequentially. In some embodiments, event notification request messages received in excess of the server-defined limit cause the storage server 110 to send failure messages in response (for example, with a failure status identifier and a zero-length data payload). Upon a disconnect (for example, because a compute instance 108 detaches the corresponding storage volume 114), any pending event notification request messages can be dropped along with any other pending I/O requests.

In some embodiments, a storage server 110 does not respond to an event notification response message until a corresponding event occurs, nor does a storage server 110 send an event notification response message unless the server has a pending request message from the client computing device 106. In the case that one or more system events related to a connection lacking an associated event notification request message occur, the storage server 110 can queue the corresponding event notification response messages and await receipt of an event notification request message, at which time the storage server 110 can respond accordingly. In other examples, storage servers 110 can generate and send event notification messages whether a pending event notification request message has been received from the related computing devices 106 or not.

At circle "2" in FIG. 1, an event occurs that is related to one or more of the storage volumes 114 hosted by the storage server 110. In one embodiment, a storage server 110 can monitor for a defined set of events that cause the storage server 110 to generate and send one or more event notification messages, and the defined set of events can grow or change over time, as desired. The process for monitoring for occurrences of each event can be dependent on the type of event, as described in reference to the examples below and elsewhere herein.

One example type of event that can occur is the unavailability of a failover server (for example, one of failover servers 122). A failover server 122 may become unavailable, for example, because the failover server 122 is experiencing a hardware failure, one or more of the replicated storage volumes on the failover server 122 are being migrated to another failover server, or for any other reason. In FIG. 1, for example, a failover server 122 may experience a hardware failure that causes the server to become unavailable as a backup server for one or more storage volumes 114 hosted by a storage server 110. In this example, an event notification message can be generated and communicated to any computing device 106 that currently believes that the now unavailable failover server 122 is the failover server for one or more storage volumes 114 attached to an instance running on the computing device. In this example, if the unavailable failover storage server 122 later becomes available again, a storage server 110 can send another event notification message to relevant client computing devices 106 indicating that the failover server is again the failover server to be used by the computing devices. If the unavailable failover server 122 is instead replaced by a different failover server, the storage server 110 can send an event notification message to relevant client computing devices 106 identifying the new failover server (for example, identified by an IP address or other type of server identifier). As indicated by the examples above, a set of events that cause generation of event notification messages can include the unavailability of failover servers, the addition of one or more new failover servers, where the addition of a failover server can be to replace a previous failover server that is no longer available for use, to add one or more additional redundant failover servers, or any other reason.

Figure 2:
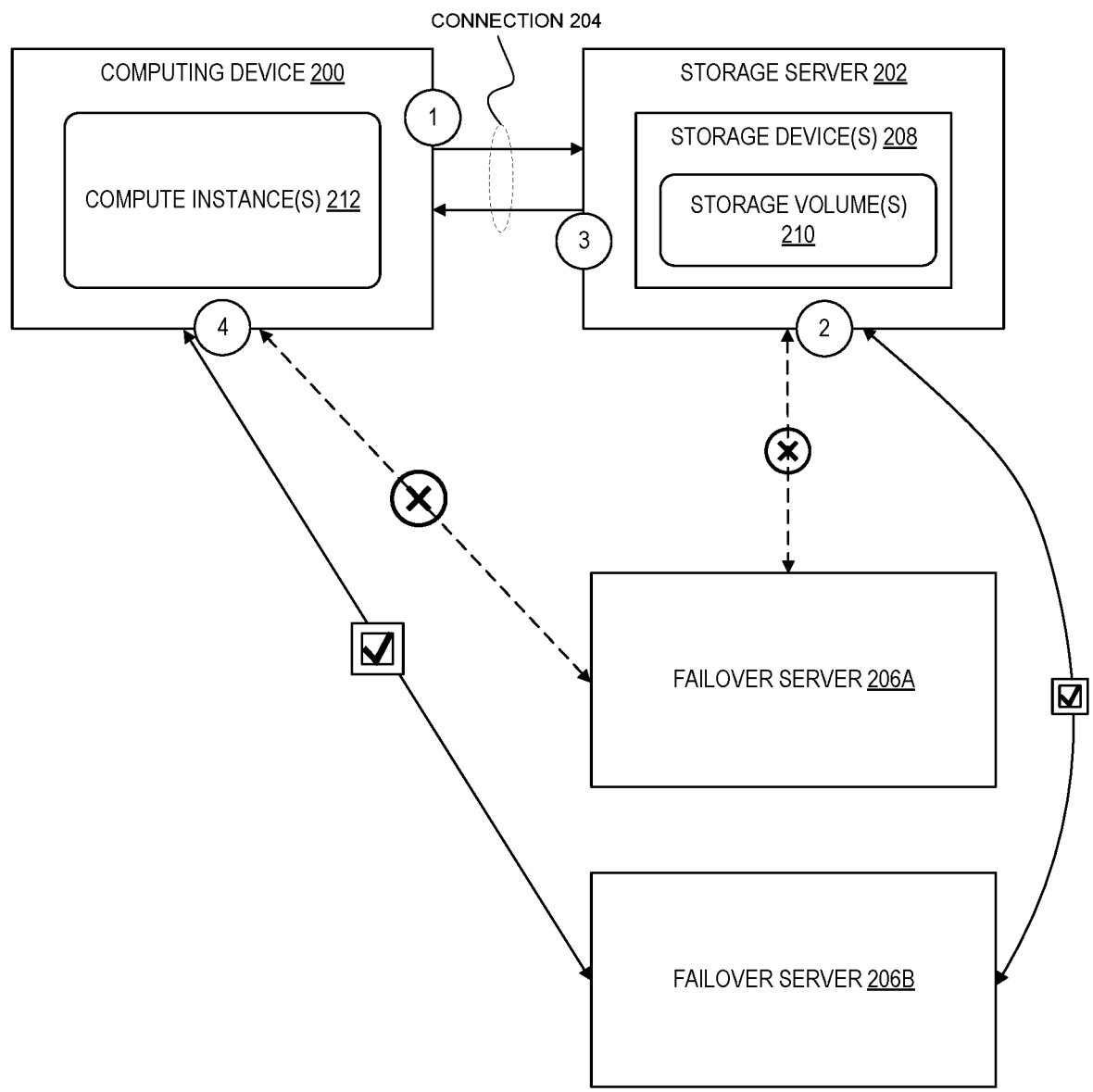
FIG. 2 illustrates the exchange of state information between a storage server and a client computing device in the event of a failover server change according to some embodiments.

FIG. 2 illustrates the exchange of state information between a storage server and a client compute instance in the event of a failover server change. As shown in FIG. 2, a client computing device 200 and a storage server 202 have established a connection 204, as described above in reference to FIG. 1. For example, the connection 204 may have been established in response to one or more compute instances 212 attaching one or more storage volumes 210 stored on storage devices 208 of the storage server 202. At the circle labeled "1" in FIG. 2, the client computing device 200 sends the storage server 202 one or more event notification request messages, which can be queued by the storage server 202 pending an occurrence of a corresponding event.

At the circle labeled "2" in FIG. 2, the storage server 202 detects that the failover server 206A has become unavailable for use as a failover server and identifies a new failover server 206B to replace the failover server 206A and, at circle "3," sends one or more event notification messages to the client computing device 200 reflecting the occurrence of these events. The storage server 202 may detect the unavailability of the failover server 206A, for example, by detecting the unavailability directly (for example, in response to not being able to connect or receiving one or more failure messages from the failover server 206A when the storage server 202 attempts to write to the failover server 206A), or the storage server 202 may obtain information about the failover server's unavailability from another system components. Similarly, the storage server 202 can detect the availability of new failover server 206B from a management component of the storage service or from any other system component.

At the circle labeled "4," the client computing device 200 obtains the event notification message(s) and proceeds accordingly. For example, the client computing device 200 can update information stored at the client computing device 200 so that the client computing device 200 is configured to use the new failover server 206B in the event of a failure instead of the unavailable failover server 206A. Whereas before the use of event notification messages, a client computing device 106 might first unsuccessfully attempt to connect to the unavailable failover server 206A before requesting information about a replacement failover server, the client computing device 200 can use the state information obtained in the event notification message(s) to more efficiently failover to an available failover server.

In one embodiment, another example type of event that can occur involves a server-initiated request for a client computing device 106 to failover to a corresponding failover server 122, the request optionally including an indication of a reason for the server-requested failover. As one example, an event notification message can indicate to a client computing device 106 that the storage server 110 is pending an update that is to cause the storage server to become temporarily unavailable to the client computing device. In this example, because a storage server 110 becoming unavailable affects any client compute instances 108 having an attached storage volume 114 hosted by the storage server 110, event notification messages can be communicated to via all active connections 118 at the storage server. Upon receiving such an event notification message, each client computing device 106 can optionally disconnect from the storage server 110 and connect to an appropriate failover storage server 122, or instead determine to wait for the update to complete and reconnect to the storage server, or take any other action. The primary storage server 110 can then perform the software update and restart with less impact on the connected client computing devices 106 than if the connections were severed without warning.

Figure 3:
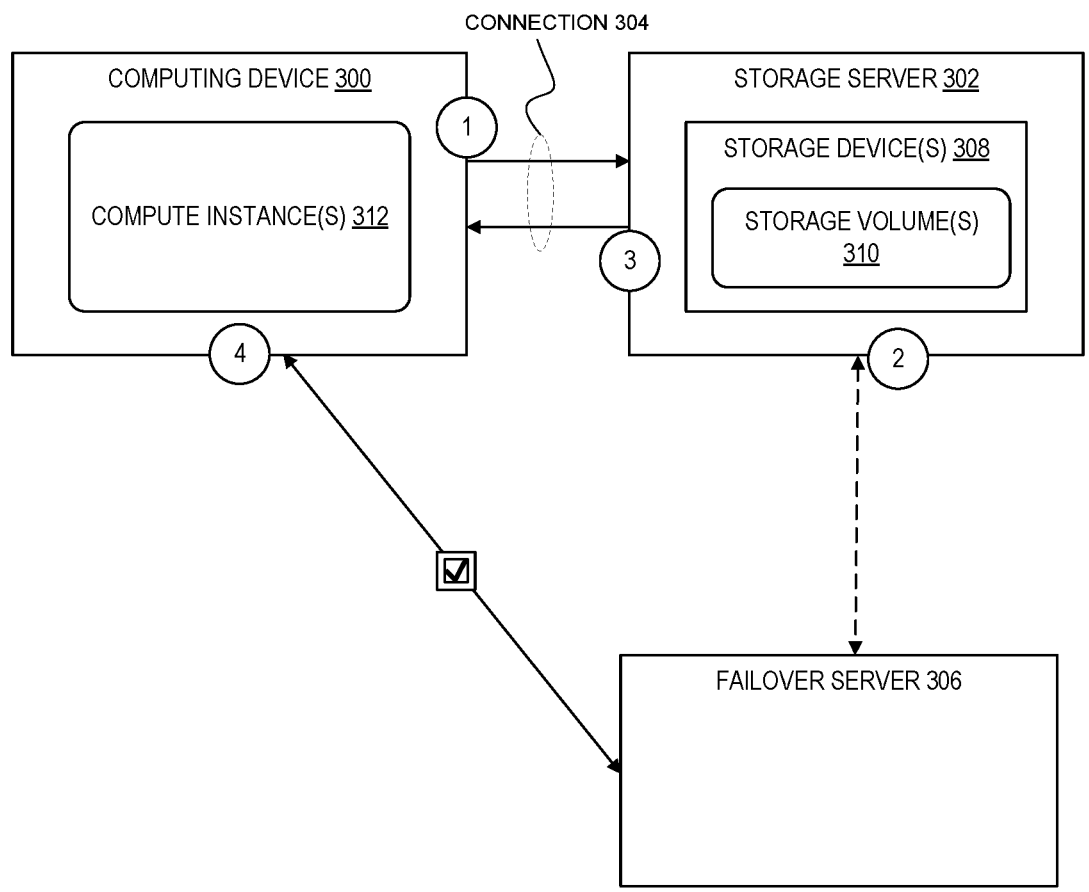
FIG. 3 illustrates the exchange state information between a storage server and a client computing device in the event of a storage server becoming temporarily unavailable to perform an update according to some embodiments.

FIG. 3 illustrates the exchange state information between a storage server and a client compute instance in the event of a storage server becoming temporarily unavailable to perform an update. As shown in FIG. 3, a client computing device 300 and a storage server 302 have established a connection 304, as described above. For example, the connection 304 may have been established in response to one or more compute instances 312 attaching one or more storage volumes 310 stored on storage devices 308 of the storage server 302. At the circle labeled "1," the client computing device 300 sends the storage server 302 one or more event notification request messages.

At the circle labeled "2" in FIG. 3, the storage server 302 detects that the storage server 302 is to perform an update that is to cause the storage server 302 to become temporarily unavailable and, at circle "3," the storage server 302 sends one or more event notification messages to the client computing devices 300 reflecting this information. For example, the storage server 302 may determine that the storage server is to perform the update based on receiving update instructions from a system update manager or other component of a storage service of which the storage server is a part.

At the circle labeled "3," the client computing devices 106 obtains the event notification message(s) and determined an action to take in response. In some cases, a client computing device 300 may disconnect from the primary storage server 302 and connect to a corresponding failover server 306 hosting a replicated copy of affected storage volumes. In other cases, a client computing device 300 may determine that it is more efficient to wait for the storage server 302 to perform its update and to reconnect to the storage server 302 at a later time instead of failing over. This determination may be made, for example, based on a number of I/O operations inflight with the primary storage server 302, performance expectations of the client computing device 300, among other considerations.

As another example, a storage server 110 may generate an event notification message instructing a client computing device 106 to failover to another server that has a more "hydrated" copy of an associated storage volume. In an embodiment, the hydration of a storage volume generally refers to an amount of the storage volume that a hosting server has stored locally relative to other portions of the storage volume which may be stored externally and to which the storage server has only a reference to. For example, in some cases, a storage server can host a storage volume and "lazy load" the data comprising the storage volume from another storage location. In some embodiments, a background job or other process on a primary storage server 110 or other system component can poll failover servers or other peer storage servers storing a copy of a same storage volume to obtain relative volume hydration levels. In this example, if a storage server determines that a relative volume hydration level associated with a peer storage server exceeds a defined threshold, the primary storage server may send an event notification message instructing relevant client computing devices to failover to the peer server. In some cases, the use of a storage server hosting a more hydrated copy of a storage volume can significantly decrease I/O latency and can outweigh the cost of the client computing device performing a failover to access the more hydrated volume.

As yet another example, an event notification message can be generated by a storage server 110 to send health notifications about the storage server, one or more failover servers, or both. For example, if a storage server 110 detects that its performance has degraded by a threshold amount, the storage server 110 can send an event notification message to any client computing device 106 that uses the storage server indicating the performance degradation. In response to receiving such an event notification message, each client computing device 106 can determine whether to failover to a healthier failover server or remain connected to the primary storage server 110 depending on performance expectations at the client computing device. As indicated above, in some embodiments, a client computing device 106 may determine whether to failover in this example and others based on a number of pending I/O operations or other inflight operations involving the primary storage server. For example, if a client computing device 106 receives a failover instruction from a storage server 110 and an I/O operation queue for the storage server 110 currently is large, the client computing device 106 may attempt to sufficiently drain the queue before performing the failover to avoid having to reinitiate a large number of I/O operations.

In an embodiment, an event notification message can be generated by a storage server 110 to indicate that the storage server supports one or more protocols that may be supported by one or more connected client computing devices. For example, the one or more advertised protocols can include various transport layer or other types of protocols that the computing devices and storage servers can use to communicate I/O operations or any other type communications. In response to receiving such an event notification message, a client computing device can determine whether the client supports the advertised protocol(s) and, if so, can begin communicating using the advertised protocol(s).

In an embodiment, a storage server 110 can in some cases detect the occurrences of two or more system events (for example, a failover server becoming unavailable and a failover server being added) before the storage server 110 is able to respond to any corresponding and pending event notification request messages from relevant client computing devices 106. As indicated above, if a storage server 110 detects an occurrence of an event that is associated with a connection without any pending event notification request messages, the storage server 110 can queue the event and awaits receipt of a request message. In one embodiment, a storage server 110 can "coalesce" the events in such a queue in some instances to avoid sending event information to client computing device 106 that may be stale or otherwise out of date. For example, if a storage server 110 detects multiple failover server changes that occur between any two event notification requests from a client computing device 106, the storage server can coalesce those events into a single event message (indicating the most up to date failover server information) that is ultimately sent to any relevant client computing devices 106.

Returning again to FIG. 1, in an embodiment, circle "3" illustrates a storage server 110 sending an event notification message to a client computing device 106, as described in the examples above. In an embodiment, an event notification message can include various items of information related to the event. For example, in the case of a failover server 122 becoming unavailable or a new failover server being added, an event notification message can include an identifier (for example, an IP address) of the failover server. In some embodiments, an event notification message can include information instructing a client computing device 106 to failover based on an identified failover reason, where the failover reason can be provided based on a set of defined failover reason codes, as indicated above. In some embodiments, the event notification message data can be included as payload data between the response and the trailer of a network message, similar to the form other I/O messages communicated between the client computing devices 106 and storage servers 110. In one embodiment, if a client computing device 106 receives an event notification message specifying an unknown event type or an unknown failover reason code, the client computing device optionally can ignore the message.

In one embodiment, each event notification message specifies information about a single event. In other embodiments, some event notification messages can include information about multiple events (for example, an event notification message that informs a client computing device 106 both that a failover server has been lost and that a different failover server has been added). As indicated above, if the number of events detected by a storage server 110 exceeds a number of corresponding and pending event notification request messages received by the storage server 110, the excess event notification messages can be queued by the storage server 110. Upon a disconnect, the event notification queue may or may not be drained depending on the implementation.

As indicated above, because a storage server 110 can host multiple storage volumes 114 that can be attached to multiple different client compute instances 108, some events can be relevant to more than one client compute instance 108 and/or client computing device 106. For example, if a storage server 110 determines that it is to perform a software update and restart, the temporary unavailability of the storage server 110 potentially impacts any compute instance 108 that has one or more attached storage volumes hosted by the storage server. In this example, a storage server 110 can send event notification messages on any and all connections to which an event is relevant. As another example, if there is more than one client connection for a given volume (for example, primary and standby connections during a process for migrating a compute instance 108 from one computing device 106 to another), a storage server 110 can provide event notifications simultaneously to each connected device. In an embodiment, each connection 118 is associated with a separate event queue, which allows the occurrence of an event to complete outstanding requests for some connections (for example, connections associated with one or more pending event notification request messages) and to be queued for others (for example, connections without pending event notification request messages).

In some embodiments, using network-based communication channels to exchange state information between client computing devices and storage servers can also be applied to communication among storage servers 110, failover servers 122, and any other system components within a distributed storage environment. In the example of a storage server 110 or failover server 122 performing a software update that causes the server to become temporarily unavailable, the storage server 110 or failover server 122 can send an event notification message to the other so that the other server can anticipate requests from client computing devices 106 to perform the failover and can take appropriate action.

In some instances, a client computing device 106 may receive event notification messages from both a primary storage server 110 and a failover server 122 instructing the client computing device to failover to the other near in time to one another (for example, because both servers are attempting to perform an update near in time). In this example, a client computing device 106 can be configured to ignore such requests instead of proceeding to failover back and forth between the servers. In some embodiments, a client computing device 106 can generate a responsive event notification message informing one or both servers that the client computing device 106 is refusing such a failover instruction. This information may be useful, for example, if both the primary storage server and the failover server are attempting to perform updates near in time to another and may allow the servers to negotiate and stagger the updates so that at least one of the servers is available to connected client computing devices 106 while the updates are performed.

Figure 4:
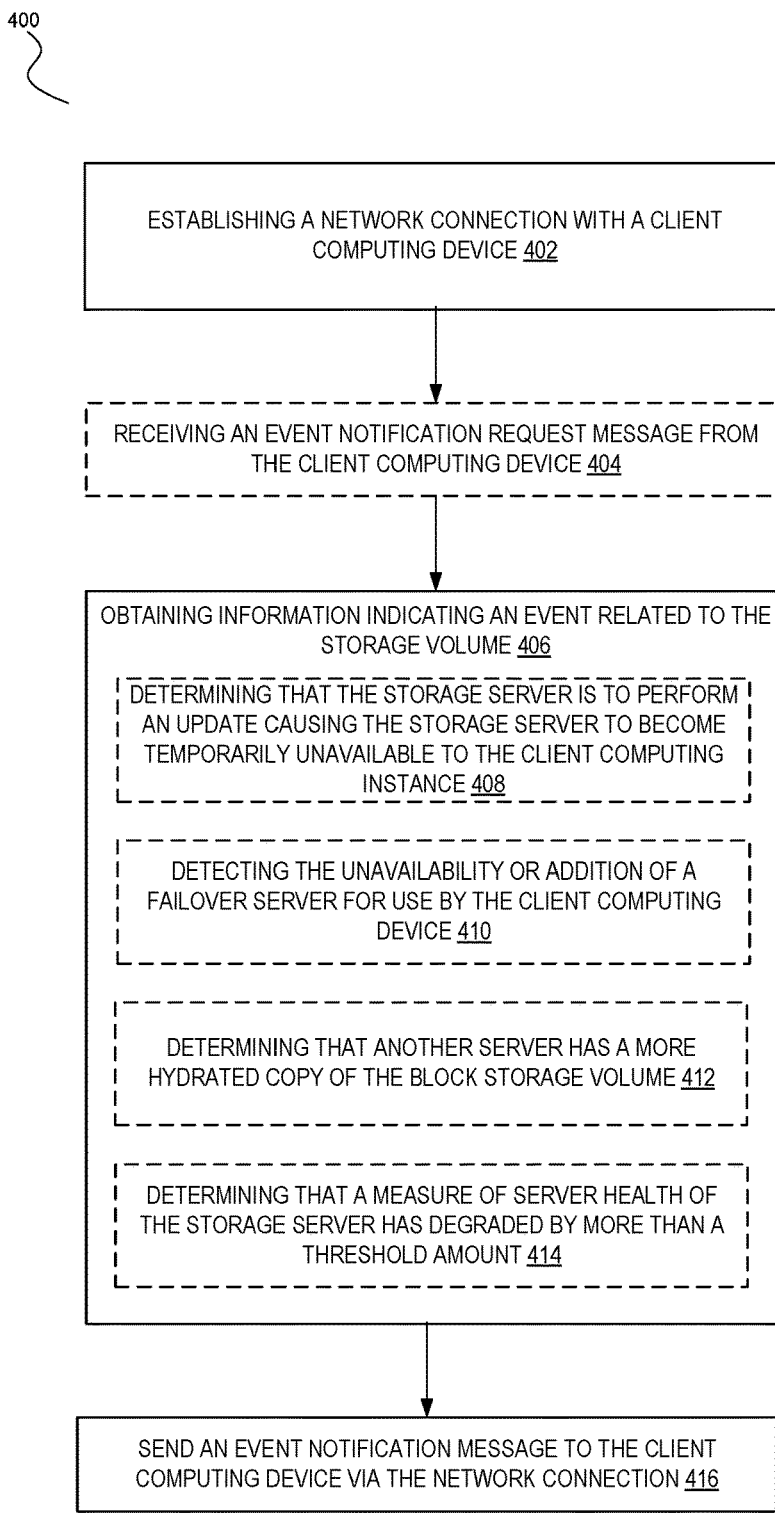
FIG. 4 is a flow diagram illustrating operations of a method for exchanging state information between storage servers and client computing devices according to some embodiments.

FIG. 4 is a flow diagram illustrating operations 400 of a method for exchanging state information among storage servers and client computing devices in a distributed storage environment according to some embodiments. Some or all of the operations 400 (or other processes described herein, or variations, and/or combinations thereof) are performed under the control of one or more computer systems configured with executable instructions and are implemented as code (for example, executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 400 are performed by storage servers 110, client computing devices 106, or other components of a service provider network 100 of the other figures.

The operations 400 include, at block 402, a storage server establishing a network connection with a client computing device, the network connection used by the client computing device to perform I/O operations on a storage volume hosted by the storage server. For example, as illustrated in FIG. 1, a storage server 110 can establish a connection 118 with a client computing device 106, for example, in response to a compute instance 108 running on the client computing device requesting to attach a storage volume 114 hosted by the storage server 110. In one embodiment, the storage server is managed by a storage service of a service provider network, and the client computing device is managed by a hardware virtualization service of the service provider network (for example, by a hardware virtualization service 102 and storage service 104 depicted in FIG. 1).

In one embodiment, at block 404, the storage server optionally receives an event notification request message from the client computing device. As described in reference to circle "1B" in FIG. 1, a client computing device 106 may send one or more event notification request messages at any point after a connection 118 is established with a storage server 110. In one embodiment, the storage server receives a plurality of event notification request messages from the client computing device. In this example, the storage server stores at least one of the plurality of event notification request messages in a queue.

The operations 400 further include, at block 406, obtaining information indicating an event related to the storage volume. For example, at optional block 408, the storage server determines that the storage server is to perform a software update causing the storage server to become temporarily unavailable to the client computing instance. As another example, at optional block 410, the storage server detects the unavailability or addition of a failover server to be used by the client computing device. As yet another example, at optional block 412, the storage server determines that another server has a more hydrated copy of the block storage volume. As yet another example, at optional block 414, the storage server determines that a measure of server health of the storage server has degraded by more than a threshold amount. The optional blocks 408-414 are exemplary event occurrences that may result in the generation of an event notification message; however, in general, a set of system events that cause the generation of an event notification message can different in other implementations and may include more or fewer event types.

In one embodiment, the storage determines that the event is relevant to a plurality of storage volumes hosted by the storage server, wherein the plurality of storage volumes are associated with a plurality of compute instances hosted by one or more client computing devices including the client computing device. In this example, an event notification message is sent to each client compute instance of the plurality of client compute instances.

In one embodiment, the storage server obtains information indicating a plurality of events related to the storage volume. For example, the storage server may obtain information indicating both the unavailability of a failover server and the addition of new failover server before the storage server has received an event notification request message from the client computing device. In this example, the storage server can merge (or coalesce) the plurality events related to the storage volume into a single event and send an event notification message to the client compute instance based on the single event.

The operations 400 further include, at block 416, sending, via the network connection, an event notification message to the client computing device. In one embodiment, the event notification message is sent as a response to the event notification request message sent at block 404. In the example where the storage server has at least one event notification request message stored in a queue, the storage server sends the event notification message as a response to an event notification request message stored in the queue.

Figure 5:
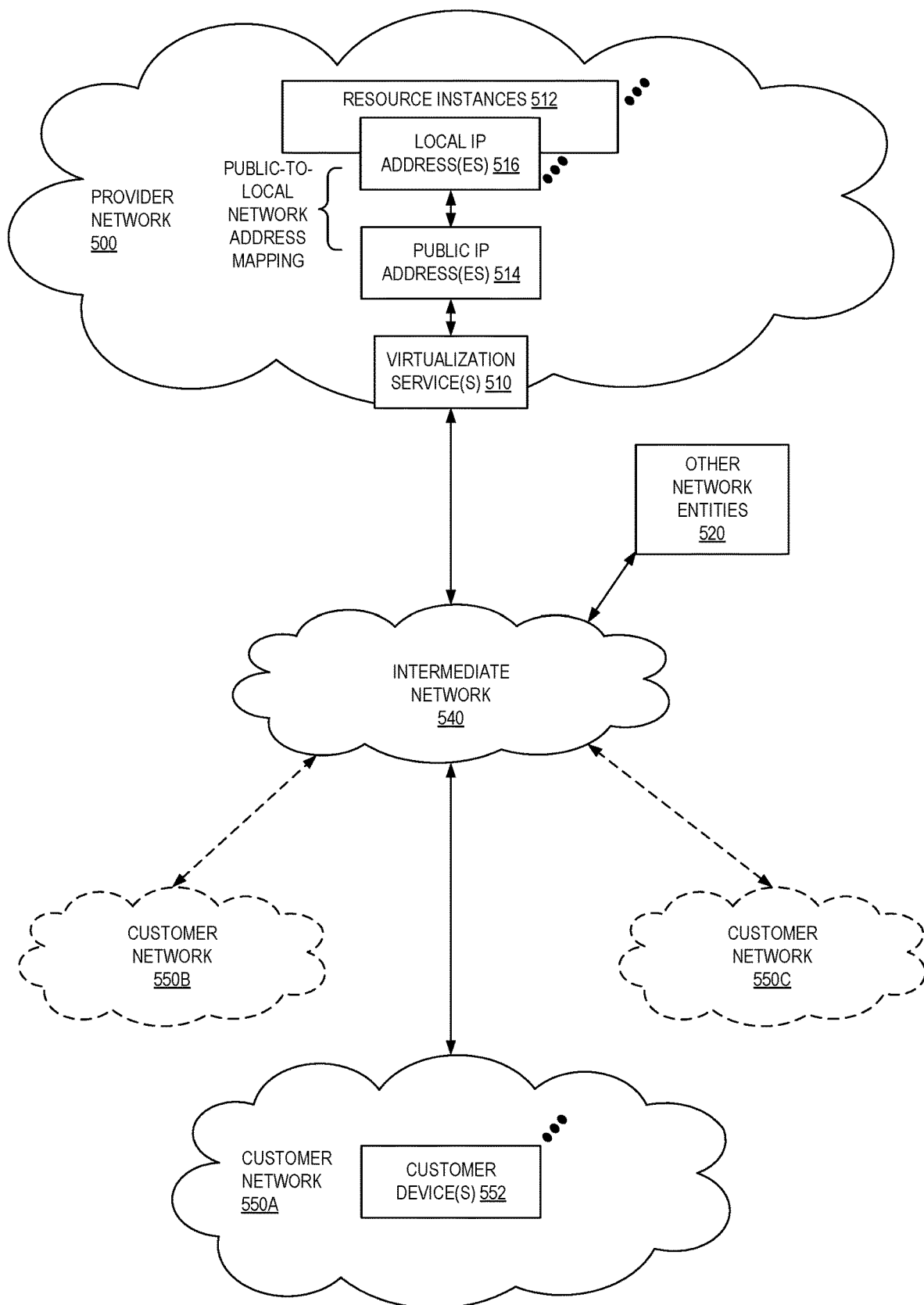
FIG. 5 illustrates an example provider network environment according to some embodiments.

FIG. 5 illustrates an example provider network (or "service provider system") environment according to some embodiments. A provider network 500 may provide resource virtualization to customers via one or more virtualization services 510 that allow customers to purchase, rent, or otherwise obtain instances 512 of virtualized resources, including but not limited to computation and storage resources, implemented on devices within the provider network or networks in one or more data centers. Local Internet Protocol (IP) addresses 516 may be associated with the resource instances 512; the local IP addresses are the internal network addresses of the resource instances 512 on the provider network 500. In some embodiments, the provider network 500 may also provide public IP addresses 514 and/or public IP address ranges (e.g., Internet Protocol version 4 (IPv4) or Internet Protocol version 6 (IPv6) addresses) that customers may obtain from the provider 500.

Conventionally, the provider network 500, via the virtualization services 510, may allow a customer of the service provider (e.g., a customer that operates one or more client networks 550A-550C including one or more customer device(s) 552) to dynamically associate at least some public IP addresses 514 assigned or allocated to the customer with particular resource instances 512 assigned to the customer. The provider network 500 may also allow the customer to remap a public IP address 514, previously mapped to one virtualized computing resource instance 512 allocated to the customer, to another virtualized computing resource instance 512 that is also allocated to the customer. Using the virtualized computing resource instances 512 and public IP addresses 514 provided by the service provider, a customer of the service provider such as the operator of customer network(s) 550A-550C may, for example, implement customer-specific applications and present the customer's applications on an intermediate network 540, such as the Internet. Other network entities 520 on the intermediate network 540 may then generate traffic to a destination public IP address 514 published by the customer network(s) 550A-550C; the traffic is routed to the service provider data center, and at the data center is routed, via a network substrate, to the local IP address 516 of the virtualized computing resource instance 512 currently mapped to the destination public IP address 514. Similarly, response traffic from the virtualized computing resource instance 512 may be routed via the network substrate back onto the intermediate network 540 to the source entity 520.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193, and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a local IP address of a resource instance is the default launch configuration for all resource instance types.

At least some public IP addresses may be allocated to or obtained by customers of the provider network 500; a customer may then assign their allocated public IP addresses to particular resource instances allocated to the customer. These public IP addresses may be referred to as customer public IP addresses, or simply customer IP addresses. Instead of being assigned by the provider network 500 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 6:
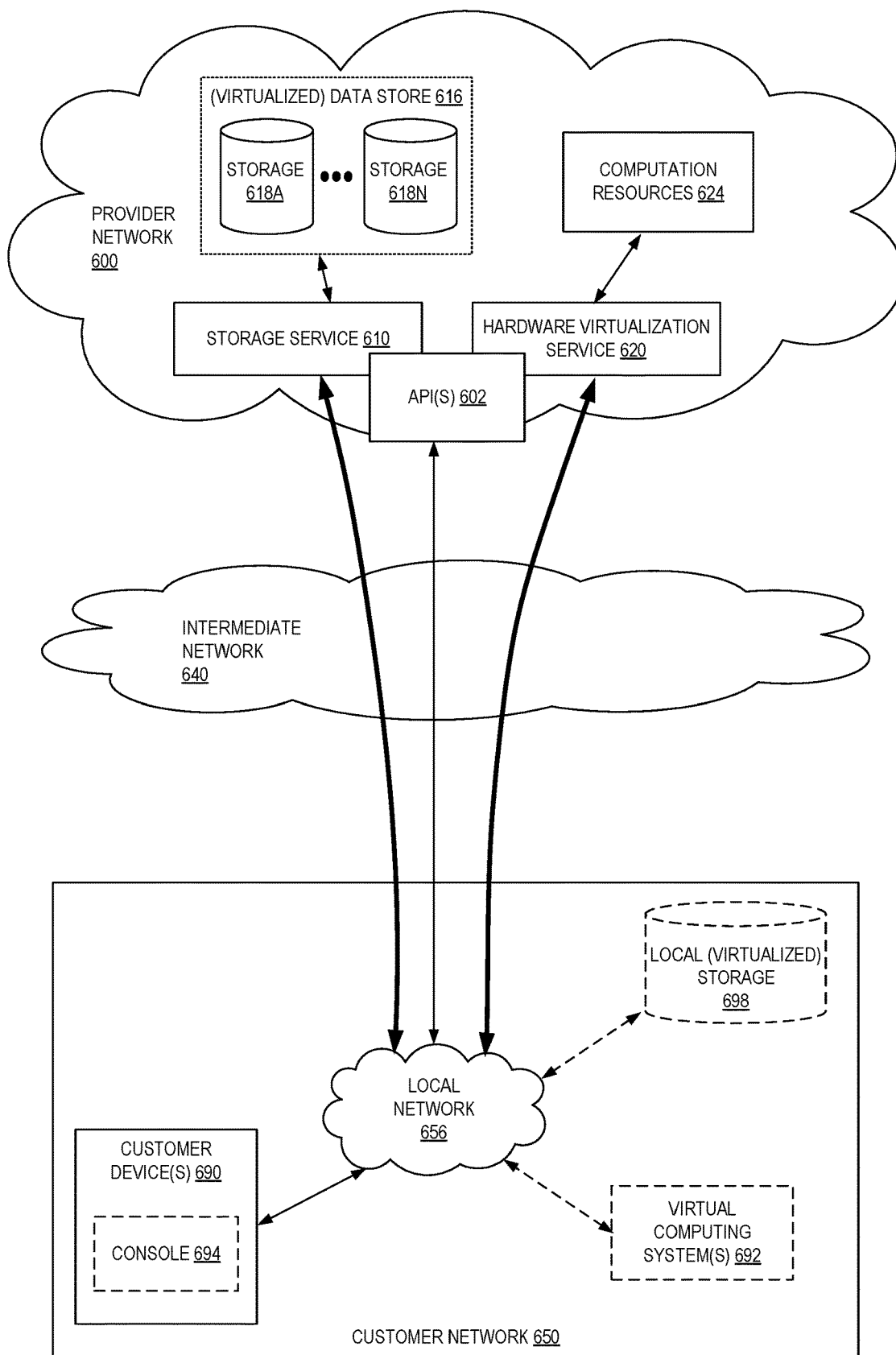
FIG. 6 is a block diagram of an example provider network that provides a storage service and a hardware virtualization service to customers according to some embodiments.

FIG. 6 is a block diagram of an example provider network that provides a storage service and a hardware virtualization service to customers, according to some embodiments. Hardware virtualization service 620 provides multiple computation resources 624 (e.g., VMs) to customers. The computation resources 624 may, for example, be rented or leased to customers of the provider network 600 (e.g., to a customer that implements customer network 650). Each computation resource 624 may be provided with one or more local IP addresses. Provider network 600 may be configured to route packets from the local IP addresses of the computation resources 624 to public Internet destinations, and from public Internet sources to the local IP addresses of computation resources 624.

Provider network 600 may provide a customer network 650, for example coupled to intermediate network 640 via local network 656, the ability to implement virtual computing systems 692 via hardware virtualization service 620 coupled to intermediate network 640 and to provider network 600. In some embodiments, hardware virtualization service 620 may provide one or more APIs 602, for example a web services interface, via which a customer network 650 may access functionality provided by the hardware virtualization service 620, for example via a console 694 (e.g., a web-based application, standalone application, mobile application, etc.). In some embodiments, at the provider network 600, each virtual computing system 692 at customer network 650 may correspond to a computation resource 624 that is leased, rented, or otherwise provided to customer network 650.

From an instance of a virtual computing system 692 and/or another customer device 690 (e.g., via console 694), the customer may access the functionality of storage service 610, for example via one or more APIs 602, to access data from and store data to storage resources 618A-618N of a virtual data store 616 (e.g., a folder or "bucket", a virtualized volume, a database, etc.) provided by the provider network 600. In some embodiments, a virtualized data store gateway (not shown) may be provided at the customer network 650 that may locally cache at least some data, for example frequently-accessed or critical data, and that may communicate with storage service 610 via one or more communications channels to upload new or modified data from a local cache so that the primary store of data (virtualized data store 616) is maintained. In some embodiments, a user, via a virtual computing system 692 and/or on another customer device 690, may mount and access virtual data store 616 volumes via storage service 610 acting as a storage virtualization service, and these volumes may appear to the user as local (virtualized) storage 698.

While not shown in FIG. 6, the virtualization service(s) may also be accessed from resource instances within the provider network 600 via API(s) 602. For example, a customer, appliance service provider, or other entity may access a virtualization service from within a respective virtual network on the provider network 600 via an API 602 to request allocation of one or more resource instances within the virtual network or within another virtual network.

Illustrative System

Figure 7:
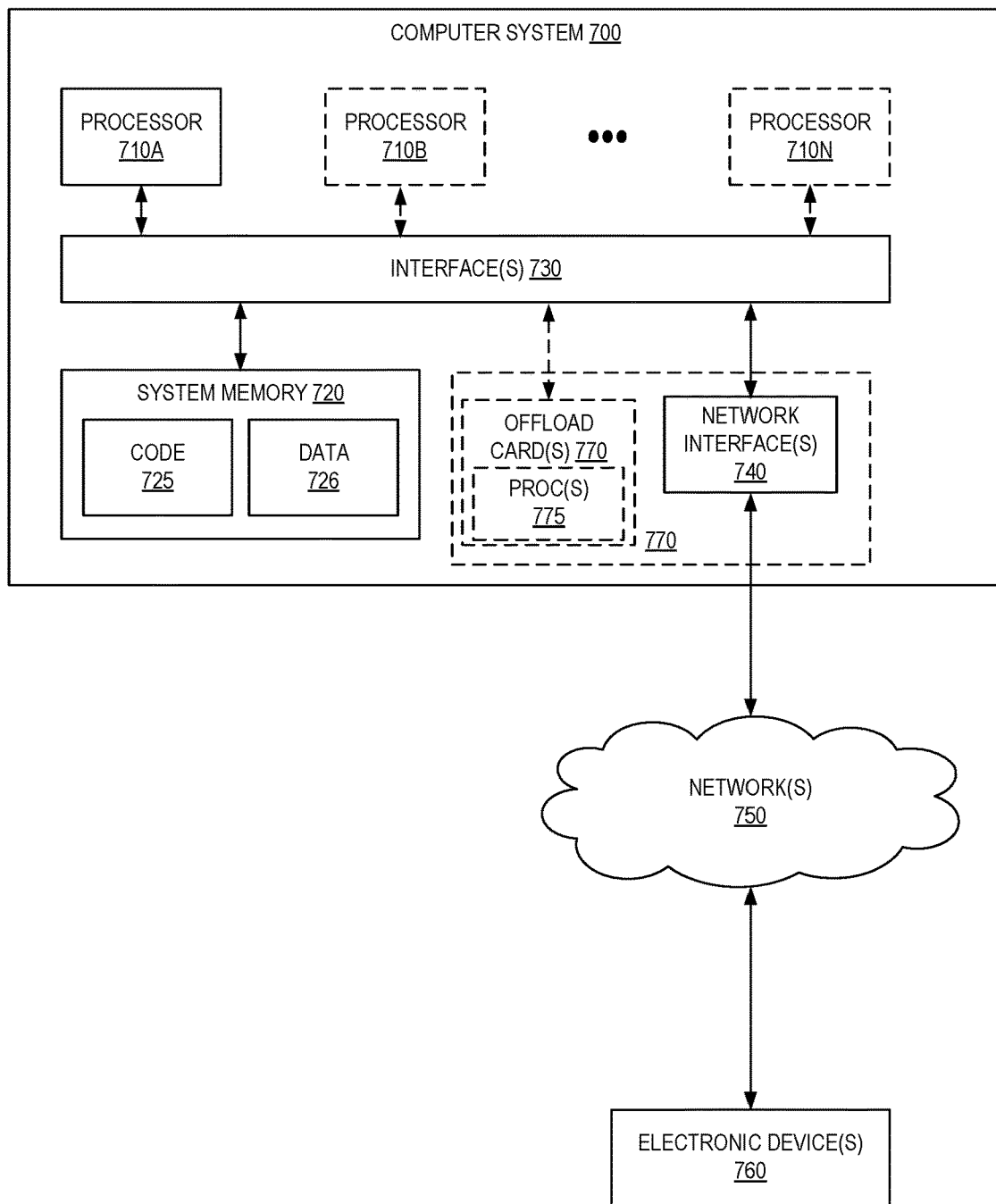
FIG. 7 is a block diagram illustrating an example computer system that may be used in some embodiments.

In some embodiments, a system that implements a portion or all of the techniques for using in-band communication channels to exchange state information between components of a distributed storage environment as described herein may include a general-purpose computer system that includes or is configured to access one or more computer-accessible media, such as computer system 700 illustrated in FIG. 7. In the illustrated embodiment, computer system 700 includes one or more processors 710 coupled to a system memory 720 via an input/output (I/O) interface 730. Computer system 700 further includes a network interface 740 coupled to I/O interface 730. While FIG. 7 shows computer system 700 as a single computing device, in various embodiments a computer system 700 may include one computing device or any number of computing devices configured to work together as a single computer system 700.

In various embodiments, computer system 700 may be a uniprocessor system including one processor 710, or a multiprocessor system including several processors 710 (e.g., two, four, eight, or another suitable number). Processors 710 may be any suitable processors capable of executing instructions. For example, in various embodiments, processors 710 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 710 may commonly, but not necessarily, implement the same ISA.

System memory 720 may store instructions and data accessible by processor(s) 710. In various embodiments, system memory 720 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above are shown stored within system memory 720 as code 725 and data 726.

In one embodiment, I/O interface 730 may be configured to coordinate I/O traffic between processor 710, system memory 720, and any peripheral devices in the device, including network interface 740 or other peripheral interfaces. In some embodiments, I/O interface 730 may perform any necessary protocol, timing or other data transformations to convert data signals from one component (e.g., system memory 720) into a format suitable for use by another component (e.g., processor 710). In some embodiments, I/O interface 730 may include support for devices attached through various types of peripheral buses, such as a variant of the Peripheral Component Interconnect (PCI) bus standard or the Universal Serial Bus (USB) standard, for example. In some embodiments, the function of I/O interface 730 may be split into two or more separate components, such as a north bridge and a south bridge, for example. Also, in some embodiments some or all of the functionality of I/O interface 730, such as an interface to system memory 720, may be incorporated directly into processor 710.

Network interface 740 may be configured to allow data to be exchanged between computer system 700 and other devices 760 attached to a network or networks 750, such as other computer systems or devices as illustrated in FIG. 1, for example. In various embodiments, network interface 740 may support communication via any suitable wired or wireless general data networks, such as types of Ethernet network, for example. Additionally, network interface 740 may support communication via telecommunications/telephony networks such as analog voice networks or digital fiber communications networks, via storage area networks (SANs) such as Fibre Channel SANs, or via I/O any other suitable type of network and/or protocol.

In some embodiments, a computer system 700 includes one or more offload cards 770 (including one or more processors 775, and possibly including the one or more network interfaces 740) that are connected using an I/O interface 730 (e.g., a bus implementing a version of the Peripheral Component Interconnect-Express (PCI-E) standard, or another interconnect such as a QuickPath interconnect (QPI) or UltraPath interconnect (UPI)). For example, in some embodiments the computer system 700 may act as a host electronic device (e.g., operating as part of a hardware virtualization service) that hosts compute instances, and the one or more offload cards 770 execute a virtualization manager that can manage compute instances that execute on the host electronic device. As an example, in some embodiments the offload card(s) 770 can perform compute instance management operations such as pausing and/or un-pausing compute instances, launching and/or terminating compute instances, performing memory transfer/copying operations, etc. These management operations may, in some embodiments, be performed by the offload card(s) 770 in coordination with a hypervisor (e.g., upon a request from a hypervisor) that is executed by the other processors 710A-710N of the computer system 700. However, in some embodiments the virtualization manager implemented by the offload card(s) 770 can accommodate requests from other entities (e.g., from compute instances themselves), and may not coordinate with (or service) any separate hypervisor.

In some embodiments, system memory 720 may be one embodiment of a computer-accessible medium configured to store program instructions and data as described above. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 700 via I/O interface 730. A non-transitory computer-accessible storage medium may also include any volatile or non-volatile media such as RAM (e.g., SDRAM, double data rate (DDR) SDRAM, SRAM, etc.), read only memory (ROM), etc., that may be included in some embodiments of computer system 700 as system memory 720 or another type of memory. Further, a computer-accessible medium may include transmission media or signals such as electrical, electromagnetic, or digital signals, conveyed via a communication medium such as a network and/or a wireless link, such as may be implemented via network interface 740.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters (e.g., 206A, 206B) may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method performed by a storage server in a distributed storage environment, the method comprising:
    establishing a network connection with a client computing device, the network connection used by a client compute instance running on the client computing device to perform input/output (I/O) operations on a block storage volume hosted by the storage server;
    receiving, from the client computing device, an event notification request message;
    determining that the storage server is to perform an update causing the storage server to become temporarily unavailable to the client compute instance; and
    sending, via the network connection, an event notification message to the client computing device indicating that the storage server is to perform a software update causing the storage server to become temporarily unavailable to the client computing instance and instructing the client computing device to failover to a failover storage server, wherein the event notification message is sent as a response to the event notification request message, and wherein the failover storage server hosts a copy of the block storage volume.

2. The computer-implemented method of claim 1, wherein the failover storage server is a first failover storage server hosting a first copy of the block storage volume, wherein the event notification message is a first event notification message, wherein establishing the network connection with the client computing device includes sending an identifier of the first failover storage server, and wherein the method further comprises:
    sending a second event notification message indicating that the first failover storage server is unavailable; and
    sending a third event notification message including an identifier of a second failover storage server hosting a second copy of the block storage volume.

3. The computer-implemented method of claim 1, further comprising:
    determining that the storage server is to become temporarily unavailable to a plurality of client compute instances including the client compute instance, wherein each client compute instance of the plurality of client compute instances has an attached block storage volume hosted by the storage server; and
    sending the event notification message to each client compute instance of the plurality of client compute instances.

4. A computer-implemented method comprising:
    establishing, by a storage server, a network connection with a client computing device, wherein the network connection is used by the client computing device to perform input/output (I/O) operations on a storage volume hosted by the storage server;
    receiving, from the client computing device, an event notification request message;
    obtaining, by the storage server and based on communications with a failover server hosting a copy of the storage volume, information indicating an event related to the storage volume, wherein the event is associated with an event type from a plurality of event types supported by a protocol used by the client computing device and the storage server; and
    sending, by the storage server hosting the storage volume and via the network connection between the storage server and the client computing device, an event notification message indicating the event to the client computing device, wherein the event notification message is sent as a response to the event notification request message.

5. The computer-implemented method of claim 4, wherein the event notification message is a first event notification message, and wherein the method further comprises:
    determining that the storage server is to perform a software update and become temporarily unavailable to the client computing device; and
    sending, via the network connection, a second event notification message indicating that the storage server is to perform the software update and become temporarily unavailable, wherein the second event notification message instructs the client computing device to failover to a failover storage server hosting a copy of the storage volume.

6. The computer-implemented method of claim 4, further comprising:
    determining that the event is related to a plurality of storage volumes hosted by the storage server, wherein each of the plurality of storage volumes is associated with one of a plurality of client compute instances hosted by one or more client computing devices including the client computing device; and
    sending a respective event notification message to each client compute instance of the plurality of client compute instances.

7. The computer-implemented method of claim 4, wherein the event corresponds to a failover storage server becoming unavailable or being added, and wherein the event notification message includes an identifier of the failover storage server.

8. The computer-implemented method of claim 4, wherein the event notification message indicates that the storage server supports the protocol.

9. The computer-implemented method of claim 4, further comprising:
    receiving, from the client computing device, a plurality of event notification request messages including the event notification request message;
    storing at least one of the plurality of event notification request messages in a queue; and
    sending the event notification message as a response to the event notification request message of the plurality of event notification request messages in the queue.

10. The computer-implemented method of claim 4, further comprising:
    obtaining information indicating a plurality of events related to the storage volume;
    merging the plurality of events related to the storage volume into a single event; and
    sending the event notification message to the client computing device based on the single event.

11. The computer-implemented method of claim 4, wherein the storage server is managed by a storage service of a service provider network, and wherein the client computing device is managed by a hardware virtualization service of the service provider network.

12. The computer-implemented method of claim 4, wherein the event includes a determination that the failover server has more of the storage volume stored locally than the storage server, and wherein the event notification message instructs the client computing device to failover to the failover server.

13. The computer-implemented method of claim 4, wherein the event includes a determination that the storage server is exhibiting degraded performance, and wherein the event notification message instructs the client computing device to failover to the failover server.

14. A system comprising:
a client computing device including instructions that upon execution cause the client computing device to:
establish a network connection with a storage server, wherein the network connection is used by the client computing device to perform input/output (I/O) operations relative to a storage volume hosted by the storage server,
send, via the network connection, an event notification request message to the storage server, and
receive, via the network connection, an event notification message from the storage server instructing the client computing device to failover to a failover storage server hosting a copy of the storage volume; and
the storage server implemented by a second one or more electronic devices, the storage server including instructions that upon execution cause the storage server to:
receive, from the client computing device, the event notification request message,
obtain, based on communications with a failover server hosting a copy of the storage volume, information indicating an event related to the storage volume, wherein the event is associated with an event type from a plurality of event types supported by a protocol used by the client computing device and the storage server,
send, via the network connection, the event notification message to the client computing device, wherein the event notification message is sent as a response to the event notification request message.

15. The system of claim 14, wherein the event notification message is a first event notification message, and wherein the storage server includes further instructions that upon execution cause the storage server to:
determine that the storage server is to perform a software update and become temporarily unavailable; and
send, via the network connection, a second event notification message indicating that the storage server is to perform the software update and become temporarily unavailable, wherein the second event notification message instructs the client computing device to failover to the failover storage server hosting the copy of the storage volume.

16. The system of claim 14, wherein the event corresponds to a failover storage server becoming unavailable or being added, and wherein the event notification message includes an identifier of the failover storage server.

17. The system of claim 14, wherein the event notification message indicates that the storage server supports the protocol.

18. The system of claim 14, wherein the storage server further includes instructions that upon execution cause the storage server to:
receive, from the client computing device, a plurality of event notification request messages;
store at least one of the plurality of event notification request messages in a queue; and
send the event notification message as a response to an event notification request message of the plurality of event notification request messages in the queue.

19. The system of claim 14, wherein the storage server further includes instructions that upon execution cause the storage server to:
obtain information indicating a plurality of events related to the storage volume;
merge the plurality of events related to the storage volume into a single event; and
send an event notification message to the client computing device based on the single event.

* * * * *